United States Patent [19]

Hisaki et al.

[11] Patent Number: 4,569,963

[45] Date of Patent: Feb. 11, 1986

[54] ADHESIVE COMPOSITION FOR BONDING FIBERS TO RUBBER

[75] Inventors: Hiroshi Hisaki, Kamakura; Yasuhiro Nakano, Tokyo; Naohiko Takahashi, Tokuyama; Yuichi Inoue, Kurashiki, all of Japan

[73] Assignee: Nippon Zeon Co., Ltd., Tokyo, Japan

[21] Appl. No.: 627,542

[22] Filed: Jul. 3, 1984

[30] Foreign Application Priority Data

Jul. 5, 1983 [JP] Japan ................... 58-122178

[51] Int. Cl.⁴ .............. C08L 9/08; C08L 39/08; C09J 3/16; C09J 3/12
[52] U.S. Cl. .................... 524/458; 524/510; 524/511; 428/378; 156/910
[58] Field of Search ............ 524/511, 504, 458, 510; 156/910

[56] References Cited

U.S. PATENT DOCUMENTS

| | | | |
|---|---|---|---|
| 3,895,163 | 7/1975 | Elmer | 524/511 |
| 3,960,796 | 6/1976 | Wise | 524/510 |
| 4,012,350 | 3/1977 | Burke | 524/511 |
| 4,060,658 | 11/1977 | Lin | 524/511 |
| 4,409,343 | 10/1983 | Wise | 524/504 |
| 4,436,866 | 3/1984 | Girgis | 524/510 |
| 4,439,556 | 3/1984 | Girgis | 524/510 |

FOREIGN PATENT DOCUMENTS 2091744 8/1982 United Kingdom ............... 524/458

*Primary Examiner*—C. Warren Ivy
*Attorney, Agent, or Firm*—Sherman and Shalloway

[57] ABSTRACT

An adhesive composition for bonding fibers to a rubber is made of an aqueous dispersion composed mainly of a resorcinol/formaldehyde resin and a rubbery vinylpyridine copolymer latex. Particles of the rubbery vinylpyridine copolymer latex having a weight-average particle size of at least 0.15 micron, provided when the weight-average particle size is less than 0.16 micron, the particles having a particle size of at least 0.18 micron amount to at least 5% by weight.

13 Claims, No Drawings

ADHESIVE COMPOSITION FOR BONDING FIBERS TO RUBBER

This invention relates to an adhesive composition for bonding fibers to a rubber, said composition being made of a rubbery vinylpyridine copolymer latex having a large particle size and a resorcinol/formaldehyde resin and having improved adhesion.

In order to bond reinforcing fibers such as polyamides, polyesters, etc. to rubbers, the fibers have been so far dipped in aqueous dispersions composed mainly of resorcinol/formaldehyde resins and latices. Commonly used latices are a vinylpyridine/styrene/butadiene copolymer latex and a latex mixture of said latex and a styrene/butadiene copolymer latex or a natural rubber latex.

To meet a demand of increasing an adhesion between reinforcing fibers and rubbers, it is necessary that in the conventional vinylpyridine copolymer latex, its proportion in the adhesive is raised or the amount of the adhesive applied to fibers is increased. It has been therefore desired to develop a vinylpyridine copolymer latex wherein the adhesion is improved without varying the conventional amounts of the latex and the adhesive.

It is an object of this invention to provide, in compliance with the above demand, an adhesive composition having improved adhesion between reinforcing fibers contained in rubber articles such as tires, belts, hoses, etc. and rubbers.

The present inventors have made extensive studies to develop a latex having a more improved adhesion than that of the conventional vinylpyridine copolymer latex, and found consequently that surprisingly enough, when the particle size of the latex is by far larger than that of the conventional latex, the adhesion increases, contrary to the ordinary knowledge that as the particle size of the latex goes larger, permeation into fibers becomes worse and the adhesion decreases.

Thus, the present invention provides an adhesive composition for bonding fibers to a rubber, said composition being made of an aqueous dispersion composed mainly of a resorcinol/formaldehyde resin and a rubbery vinylpyridine copolymer latex, characterized by using a rubber vinylpyridine copolymer latex whose particles have a weight-average particle size of at least 0.15 micron, provided when the weight-average particle size is less than 0.16 micron, the particles having a particle size of at least 0.18 micron amount to at least 5% by weight.

The rubbery vinylpyridine copolymer latex used in this invention features that the weight-average particle size of the latex is by far larger than that (0.06 to 0.09 micron) of the conventional latex. That is, the latex of this invention must have a weight-average particle size of at least 0.15 micron and contain at least 5% by weight of latex particles of 0.18 micron when the weight-average particle size is less than 0.16 micron. Unless this condition is satisfied, the adhesion is not improved. The weight-average particle size is preferably at least 0.16 micron, more preferably at least 0.18 micron. The particle size is not limited in particular if the latex can stably exist. When the weight-average particle size becomes at least 0.2 micron, the adhesion reaches approximately an equilibrium, but there can be obtained an effect of improving a workability owing to decrease in viscosity of a latex. However, considering a stability, etc. in producing latices, it is not practical that the weight-average particle size exceeds 2 microns.

The weight-average particle size of the latex particles used in this invention is one resulting from calculating an average particle size found by microphotography in terms of a weight average.

The rubbery vinylpyridine copolymer latex of this invention is usually a copolymer latex comprising 45 to 95% by weight of butadiene, 0 to 30% by weight of styrene and 5 to 30% by weight of vinylpyridine.

Butadiene is not limited to 1,3-butadiene but may be replaced by one or more of aliphatic conjugated diene monomers such as 2-methyl-1,3-butadiene, 2-chloro-1,3-butadiene, etc. Part or the whole of styrene may be replaced by one or more of vinyl benzene compounds such as α-methylstyrene, 2-methylstyrene, 3-methylstyrene, 4-methylstyrene, 2,4-diisopropylstyrene, 2,4-dimethylstyrene, 4-tert-butylstyrene, 5-tert-butyl-2-methylstyrene, monochlorostyrene, dichlorostyrene, monofluorostyrene and hydroxymethylstyrene, and aliphatic vinyl compounds such as ethylene, propylene, acrylonitrile and vinyl chloride. Vinylpyridine may be replaced by one or more of 3-vinylpyridine, 4-vinylpyridine, 2-methyl-5-vinylpyridine and 5-ethyl-2-vinylpyridine. The most common example of the latex in this invention can be a copolymer latex composed of 70% by weight of butadiene, 15% by weight of styrene and 15% by weight of 2-vinylpyridine. A Mooney viscosity ($ML_{1+4}$, 100° C.) of the polymer in the vinylpyridine copolymer latex of this invention is 10 to 80, preferably 15 to 50, more preferably 15 to 40. Where said viscosity deviates from this range, the adhesion between rubbers and fibers decreases.

No special method is needed to produce the latex of this invention. There can be employed conventional methods such as a method wherein a surface active agent is added portionwise, a method using seed latices, a method wherein particles are agglomerated by vigorous stirring, and so forth. In these methods, latices different in particle size may be mixed, latices be produced by single stage polymerization of a monomer mixture and a monomer composition of core and shell of latex particles be changed.

The resorcinol/formaldehyde resin used in this invention is not limited in particular and may be conventional resins, for example, shown in U.S. Pat. No. 4,251,409. It is also possible to conjointly use compounds such as 2,6-bis(2,4-dihyroxydiphenylmethyl)-4-chlorophenol (Vulcabond E) that has been to date used to increase the adhesion between rubbers and polyester fibers, and glycerol polyglycidyl ether (DENACOL EX-313) that has been hitherto employed to increase the adhesion between rubbers and aramid fibers.

The adhesive composition of this invention is usually one obtained by mixing 10 to 40 parts by weight (dry weight) of the resorcinol/formaldehyde resin, per 100 parts by weight of solids content of the rubbery vinylpyridine copolymer latex.

Part of the vinylpyridine copolymer latex in the adhesive composition of this invention may be replaced by one more of a styrene/butadiene copolymer latex, its modified latex, an arcylonitrile/butadiene copolymer latex, its modified latex, and a natural rubber latex.

A method of using the adhesive composition in this invention is not limited in particular, and it may be applied like known resorcinol/formaldehyde/latex adhesives. Usually, fibers can be bonded to rubbers such that the adhesive composition of this invention is formed into a 10 to 30 wt.% aqueous dispersion, and the fibers are dipped in the dispersion, dried and heat-treated, after which the resulting substance is molded with an unvulcanized rubber stock and the molded article is vulcanized.

Examples of the rubber include a natural rubber, cis-polyisoprene rubber, cis-polybutadiene rubber, styrene-butadiene copolymer rubber, etc. They may be used singly or as a mixture of two or more.

Fibres to which is applied the adhesive composition of this invention are not limited in particular. Examples thereof are rayon fibers, polyester fibers, polyamide fibers, aramid fibers, etc. These organic fibers may be in the form of textiles, cords, yarns, etc.

The adhesive for bonding fibers to rubbers in this invention exhibits an improved adhesion by the same formulation as that of the conventional adhesives and can be used to produce tires, belts, hoses, etc.

The following Examples illustrate the present invention specifically, but this invention is not limited to these Examples. Parts and percentages in Examples are all on dry weight basis.

Preparation Example of latices (1) An autoclave equipped with a stirrer was charged with 90 parts of water, 2 parts of potassium rosinate, 0.5 part of sodium naphthalenesulfonate, 0.15 part of potassium hydroxide, 0.5 part of tertdodecylmercaptan, 70 parts of butadiene, 15 parts of styrene and 15 parts of 2-vinylpyridine. After the temperature was raised to 60° C., 0.3 part of potassium persulfate was charged along with 10 parts of water. When a conversion reached 40%, 1 part of potassium rosinate was added to the autoclave together with 3 parts of water. Further, when the conversion reached 60%, 1 part of potassium rosinate was added along with 3 parts of water. Still further, when the conversion reached 80%, 2 parts of potassium rosinate was added along with 6 parts of water. When the conversion reached 95%, 0.05 part of hydroquinone was added to stop the reaction. Unreacted polymers were removed under reduced pressure. There resulted a latex A. A weight-average particle size of the latex A was 0.07 micron and particles with an average particle size of at least 0.18 were ar most 1%. A Mooney viscosity ($ML_{1+4}$, 100° C.) of the polymer in the latex was 60.

(2) A latex B was produced in the same way as in (1) except that when the conversion reached 60%, 1 part of potassium rosinate and 0.5 part of tertdodecylmercaptan were added along with 3 parts of water. A weight-average particle size was 0.07 micron and a Mooney viscosity ($ML_{1+4}$, 100° C.) of the polymer was 20.

(3) Likewise, the autoclave was charged with 90 parts of water, 0.5 part of potassium rosinate, 0.15 part of potassium hydroxide, 0.5 part of tert-dodecylmercaptan, 4 parts of the latex A, 67.2 parts of butadiene, 14.4 parts of styrene and 14.4 parts of 2-vinylpyridine. After the temperature was raised to 60° C., 0.3 part of potassium persulfate was changed along with 10 parts of water. When the conversion reached 60%, 0.5 part of potassium rosinate and 0.5 part of tert-dodecylmercaptan were added along with 1.5 parts of water. When the conversion reached 95%, 0.05 part of hydroquinone was added to stop the reaction. Unreacted monomers were removed under reduced pressure. There was obtained a latex C having a weight-average particle size of 0.19 micron and a Mooney viscosity of the polymer of 20.

(4) A latex D was obtained in the same way as in (3) except that the latex C was used as a seed latex instead of the latex A. A weight-average particle size of the latex D was 0.56 micron and a Mooney viscosity of the polymer in the latex was 25.

(5) A latex E was prepared as in (3) except using the latex D as a seed latex instead of the latex A. A weight-average particle size of the latex E was 1.51 microns and a Mooney viscosity of the polymer in the latex was 27.

(6) Four latices different in Mooney viscosity of the polymer were prepared by employing the same seed latices as in (3) and changing the amounts of tert-dodecylmercaptan used at 60% conversion (Mooney viscosities of the polymers in the latices F, G, H and I were 14, 20, 45 and 70 respectively). A weight-average particle size each of the latices was 0.16 micron and the particles having a particle size of at least 0.18 was 6%.

(7) Likewise, an autoclave was charged with 90 parts of water, 1 part of potassium rosinate, 0.5 part of sodium naphthalenesulfonate, 0.15 part of potassium hydroxide, 0.5 part of potassium chloride, 0.5 part of tert-dodecylmercaptan, 56 parts of butadiene, 10.5 parts of styrene and 3.5 parts of 2-vinylpyridine. After the temperature was elevated to 60° C., 0.3 part of potassium persulfate was charged along with 10 parts of water. When a conversion reached 60%, 2 parts of potassium rosinate and 0.3 part tert-dodecylmercaptan were added to the autoclave together with 6 parts of water. Further, when the conversion reached 80%, 2 parts of potassium rosinate, 21 parts of butadiene, 1.5 parts of styrene and 7.5 parts of 2-vinylpyridine were added together with 6 parts of water. When the conversion reached 95%, 0.05 part of hydroquinone was added to stop the reaction, and unreacted monomers were removed under reduced pressure. There was obtained a latex J having a weight-average particle size of 0.16 micron and containing 6% of particles with a particle size of at least 0.18 micron. A Mooney viscosity of the polymer in the latex was 20.

(8) Using the latex B as a seed latex, three latices having a Mooney viscosity of a polymer of 20 and being different in particle size were prepared in the same was as in (3).

Latex K: a weight-average particle size—0.14 micron particles having a particle size of at least 0.18 micron—1%

Latex L: a weight-average particle size—0.17 micron particles having a particle size of at least 0.18 micron—16%

Latex M: a weight-average particle size—0.153 micron particles having a particle size of at least 0.18 micron—3%

(9) Eighty % of the latex B was mixed with 20% of the latex D to form a latex N having a weightaverage particle size of 0.17 micron and containing 20% of particles with a particle size of at least 0.18 micron. A Mooney viscosity of the polymer was 22.

(10) Fifty % of the latex K was mixed with 50% of the latex L to obtain a latex O having a weightaverage particle size of 0.155 micron and containing 8% of particles with a particle size of at least 0.18 micron. A Mooney viscosity of the polymer was 20.

EXAMPLE 1

Eleven parts of resorcinol, 16.2 parts of a formalin aqueous solution (concentration 37%) and 0.3 part of sodium hydroxide were dissolved in 238.5 parts of water. The reaction was performed at 25° C. for 6 hours under stirring. Subsequently, 100 parts each of the latices shown in Table 2 was added to the reaction mixture, and the reaction was run at 25° C. for 20 hours under stirring. After the aqueous solution was adjusted to a solids content of 15%, a nylon-6 tire cord (1260 d/2) was dipped in the aqueous solution using a single cord dipping machine for use in test. After dipping, heat treatment was conducted at 200° C. for 1 minute. The thus treated nylon-6 tire cord was embedded in the natural rubber stock produced according to the formulation shown in Table 1, and press-vulcanized at 150° C. for 30 minutes. An adhesion between the tire cord and the rubber was evaluted by a T-pull method (a measuring temperature 20° C., a relative humidity 60%, a test for 24 pieces of cords). The results are shown in Table 2.

TABLE 1

Formulation of a rubber stock

| | Parts |
|---|---|
| Natural rubber | 100 |
| Zinc oxide | 5 |
| Stearic acid | 2 |
| Sulfur | 2.5 |
| FEF carbon black | 45 |
| Process oil | 5 |
| N—oxydiethylene-2-benzothiazole sulfenamide | 1 |
| 2,2,4-Trimethyl-1,2-dihydroquinone polymer | 1 |

EXAMPLE 2

Resorcinol (16.6 parts), 14.6 parts of a formalin aqueous solution (concentration 37%) and 1.3 parts of sodium hydroxide were dissolved in 333.5 parts of water, and the reaction was performed at 25° C. for 2 hours under stirring. Subsequently, 100 parts each of the latices (refer to Table 2) was added to the reaction mixture, and the reaction was run at 25° C. for 20 hours under stirring. Twenty-five parts of Vulcabond E (tradename for a product manufactured by ICI Vulnax) was then added. After the aqueous solution was adjusted to a solids content of 15%, a polyester cord (1500 d/2) was dipped in the aqueous solution using a single cord dipping machine. After dipping, the product was heat- treated at 240° C. for 1 minute. The adhesion test was performed as in Example 1. The results are shown in Table 2.

EXAMPLE 3

Aramid fibers (KEVLAR; a product manufactured by E. I. du Pont de Nemours & Company, 1500 d/2) were dipped in a solution containing 2.22 parts of DENACOL EX-313 (tradename for a product manufactured by Nagase & Co., Ltd.), 0.28 part of sodium hydroxide (10% aqueous solution), 0.56 part of "AEROSOL" OT (tradename for a product manufactured by Nippon Aerosol Co., Ltd., 5% aqueous solution) and 96.94 parts of water, using a single cord dipping machine. Heat treatment was conducted at 240° C. for 1 minute. Subsequently, the heat-treated product was dipped in the resorcinol/formaldehyde latex aqueous solution used in Example 1, and heat treated at 240° C. for 1 minute. The adhesion test was conducted as in Example 1. The results are shown in Table 2.

TABLE 2

| | Lactices | | | | | |
|---|---|---|---|---|---|---|
| No. | Weight-average particle size (micron) | Amount of particles having particle size more than 0.18 micron | Mooney viscosity ($ML_{1+4}$, 100° C.) | T-pull (kg/cm) | | |
| | | | | Nylon | Polyester | Aramid |
| Comparison | | | | | | |
| 1* | 0.06 | less than 1% | 35 | 16.2 | 16.0 | 15.9 |
| 2* | 0.07 | " | 40 | 16.1 | 15.9 | 15.8 |
| A | 0.07 | " | 60 | 16.0 | 15.7 | 15.7 |
| B | 0.07 | " | 20 | 16.5 | 16.3 | 16.2 |
| K | 0.14 | 1% | 20 | 16.6 | 16.6 | 16.5 |
| M | 0.153 | 3% | 20 | 17.0 | 16.3 | 16.2 |
| Invention | | | | | | |
| O | 0.155 | 8% | 20 | 18.6 | 18.4 | 18.2 |
| F | 0.16 | 6% | 14 | 18.7 | 18.5 | 18.4 |
| G | 0.16 | 6% | 20 | 18.6 | 18.5 | 18.4 |
| H | 0.16 | 6% | 45 | 17.9 | 17.6 | 17.5 |
| I | 0.16 | 6% | 70 | 17.5 | 17.3 | 17.3 |
| L | 0.17 | 16% | 20 | 18.6 | 18.5 | 18.4 |
| N | 0.17 | 20% | 22 | 18.7 | 18.4 | 18.3 |
| C | 0.19 | 84% | 20 | 18.9 | 18.6 | 18.6 |
| D | 0.56 | more than 99% | 25 | 18.8 | 18.6 | 18.5 |
| E | 1.51 | " | 27 | 18.7 | 18.5 | 18.4 |
| J | 0.16 | 6% | 20 | 18.6 | 18.5 | 18.3 |

*Latices 1: Nipol 2518 FS made by Nippon Zeon Co., Ltd.
Latices 2: Commercial vinylpyridine copolymer latices

What we claim is:

1. An adhesive composition for bonding organic fibers to a rubber, said composition comprising an aqueous dispersion of a resorcinol/formaldehyde resin and a rubbery vinylpyridine copolymer latex consisting of 45 to 95% by weight of aliphatic conjugated diene monomer, 0 to 30% by weight of vinyl benzene compound, and 5 to 30% by weight of a vinylpyridine monomer, said aqueous dispersion having a solid content of 10 to 30% by weight, said solid comprising 100 parts by weight of the rubbery vinylpyridine copolymer and 10 to 40 parts by weight of the resorcinol/formaldehyde resin, particles of said rubbery vinylpyridine copolymer latex having a weight-average particle size of at least 0.15 micron, provided when the weight-average particle size is less than 0.16 micron, the particles having a particle size of at least 0.18 micron amount to at least 5% by weight based on the solids of the latex.

2. The composition of claim 1 wherein the weight-average particle size of the latex particles is at least 0.16 micron.

3. The composition of claim 1 wherein the weight-average particle size of the latex particles is at least 0.18 micron.

4. An adhesive composition as set forth in claim 1 wherein the rubbery vinylpyridine copolymer latex has a Mooney viscosity ($ML_{1+4}$, 100° C.) of from about 15 to 50.

5. An aqueous dispersion useful for bonding organic reinforcing fibers including rayon fibers, polyester fibers and aromatic and aliphatic polyamide fibers, to rubber, said dispersion having a solids content of from about 10 to 30% by weight and being comprised of a resorcinol/formaldehyde resin and a rubbery vinylpyridine copolymer latex, said latex consisting essentially of a terpolymer of an aliphatic conjugated diene, an vinyl benzene compound and a vinylpyridine compound and having a Mooney viscosity ($ML_{1+4}$, 100° C.) of from 10 to 80, the solids of the dispersion having a weight-average particle size of at least 0.15 micron, provided that when the weight-average particle size is less than 0.16 micron, the particles having a particle size of at least 0.18 micron constitute at least 5% by weight of the total solids.

6. The aqueous dispersion of claim 5 wherein the rubbery vinylpyridine copolymer latex comprises 45 to 95% by weight of the diene, up to 30% by weight of the vinyl benzene compound, and 5 to 30% by weight of the vinylpyridine compound.

7. The aqueous dispersion of claim 5 wherein the diene is selected from the group consisting of 1,3-butadiene, 2-methyl-1,3-butadiene, and 2-chloro-1,3-butadiene; the vinyl benzene compound is selected from the group consisting of styrene, α-methylstyrene, 2-methylstyrene, 3-methylstyrene, 4-methylstyrene, 2,4-diisopropylstyrene, 2,4-dimethylstyrene, 4-tert.butylstyrene, 5-tert.butyl-2-methyl-styrene, monochlorostyrene, dichlorostyrene, monofluorostyrene, and hydroxymethylstyrene; and the vinylpyridine compound is selected from the group consisting of 2-vinylpyridine, 3-vinylpyridine, 4-vinylpyridine, 2-methyl-5-vinylpyridine and 5-ethyl-2-vinylpyridine.

8. The aqueous dispersion of claim 5 wherein the terpolymer is a butadiene/styrene/2-vinylpyridine terpolymer.

9. The aqueous dispersion of claim 5 wherein the weight average particle size is at least 0.16 micron.

10. The aqueous dispersion of claim 5 wherein the weight-average particle size is at least 0.18 micron.

11. The aqueous dispersion of claim 10 wherein the terpolymer has a Mooney viscosity ($ML_{1+4}$, 100° C.) of 15 to 50.

12. The aqueous dispersion of claim 5 wherein the terpolymer has a Mooney viscosity ($ML_{1+4}$, 100° C.) of 15 to 50.

13. The aqueous dispersion of claim 11 wherein the terpolymer is a butadiene/styrene/2-vinylpyridine terpolymer.

* * * * *